United States Patent [19]

Moss et al.

[11] Patent Number: 5,052,764
[45] Date of Patent: Oct. 1, 1991

[54] SYSTEM AND METHOD FOR FORMING A HOLOGRAPHIC EXPOSURE WITH A SIMULATED SOURCE

[75] Inventors: Gaylord Moss, Marina del Rey; John E. Wreede, Monrovia, both of Calif.

[73] Assignee: Hughes Aircraft Company, Los Angeles, Calif.

[21] Appl. No.: 542,452

[22] Filed: Jun. 22, 1990

Related U.S. Application Data

[63] Continuation-in-part of Ser. No. 401,394, Aug. 31, 1989, Pat. No. 4,960,311.

[51] Int. Cl.$^5$ .............................................. G03H 1/08
[52] U.S. Cl. ................................... 359/9; 359/10; 359/28; 359/34
[58] Field of Search ................ 350/3.6, 3.66, 3.67, 350/3.69, 3.81, 3.83

[56] References Cited

U.S. PATENT DOCUMENTS

| | | | |
|---|---|---|---|
| 4,111,519 | 9/1978 | Gillis et al. | 350/3.66 |
| 4,155,630 | 5/1979 | Ih | 350/3.67 |
| 4,456,328 | 6/1984 | Arnes et al. | 350/3.6 |
| 4,458,977 | 7/1984 | Arnes et al. | 350/3.6 |
| 4,458,978 | 7/1984 | Arnes et al. | 350/3.67 |
| 4,799,765 | 1/1989 | Fesser | 350/166 |
| 4,960,311 | 10/1990 | Moss et al. | 350/3.66 |

Primary Examiner—Bruce Y. Arnold
Assistant Examiner—J. P. Ryan
Attorney, Agent, or Firm—Leonard A. Alkov; Wanda K. Denson-Low

[57] ABSTRACT

A fiber optic point source is utilized to generate a first wavefront which is intersected with a second wavefront to form a desired interference pattern in a recording medium. The point source is moved relative to the recording medium during exposure in order to reduce multiple order scattering noise, and to provide a relatively large translational motion which is gradual and generally follows an angular scanning motion of the fiber optic point source.

10 Claims, 1 Drawing Sheet

SYSTEM AND METHOD FOR FORMING A HOLOGRAPHIC EXPOSURE WITH A SIMULATED SOURCE

RELATED APPLICATIONS

This application is a continuation-in-part of Ser. No. 401,394, filed Aug. 31, 1989 now U.S. Pat. No. 4,960,311.

BACKGROUND OF THE INVENTION

1. Field of the Invention

This invention relates to a system and method for exposing holograms, and more particularly, relates to a system and method for forming master holograms with a relatively large translational motion of a point source of illumination which is gradual and follows the angular scanning of the point source.

2. Description of Related Art

High quality holographic optical elements are used in diffraction optics display systems, such as a Head Up Display (HUD) for advanced aircraft, helmet mounted displays, laser eye protection devices, narrow band reflective filters, and holographic high gain screens for simulators. These are only a few of the many uses of high quality holograms. Problems can arise in providing economical mass production of reflective holographic optical elements where the production units are "copies" of either a master reference object or a master hologram, which may, for example, provide an aspheric reflective wavefront.

Diffraction optic display systems utilizing a hologram can experience a degradation of the holographic images as a result of the effects of spurious reflection and transmission hologram recordings that may be generated during the holographic replication process. The spurious noise holograms have been found to be generated by reflections from surfaces which are interfaces of materials having a different refractive index such as air/glass, or imperfect indexed matched interfaces of the surfaces of the recording cover plate, the holographic substrate, and the recording medium. These reflections can combine with the primary holographic beams at the recording medium to form both spurious reflection hologram recordings and spurious transmission hologram recordings. As a result, a subsequent display system can create ghost images from the spurious reflection hologram recordings and rainbow-like flare patterns from the spurious transmission hologram recordings.

The prior art has attempted to address these problems in numerous different ways. One approach has been to minimize the difference in indexes of refraction by attempting to match the indexes of refraction with an index matching fluid, such as mineral oil. Attempts have been made to immerse a recording module in an index of refraction matching oil bath. Another approach has been to form a hologram with energy beams impinging the recording film supporting elements at the Brewster's angle (the angle for which light of a given polarization has a very low reflectivity).

U.S. Pat. Nos. 4,458,977, 4,458,978, and 4,456,328 disclose prior art approaches to eliminate the noise caused by a glass/air interface of an outer surface cover plate by moving the cover plate to change the phase of the reflected rays relative to the primary beams during the recording period so that spurious interference patterns are not formed. The rate of movement or phase change in accordance with these solutions is a function of the exposure time which itself is a function of the sensitivity of the recording medium. The total amplitude of the movements is made sufficient to produce a phase change of one or more half wavelengths in the reflected noise beams to nullify such spurious recorded interference patterns. These approaches have been proposed to solve the problems involved in the manufacturing of reflective holographic optical elements for use in head up displays.

Generally, prior art solutions employ a layer of index matching fluid, such as an appropriate mineral oil, which can vary in thickness during the cover movement. The required relatively thick image degrading layer of index matching fluid has the capacity to degrade the image of the reference object, such as an aspheric mirror, create moving striations causing fringe degradation, and furthermore requires frequent cleaning or replacement of the oil. In a double beam recording system oil instability requires days of stabilization before a successful holographic exposure can be made. A master aspheric mirror single beam exposure system still requires many hours of stabilization and the use of relatively skilled labor.

Additionally, in the prior art approaches, generally only the outer surface, that is, the glass/air interface elements, could be provided with an antireflective coating. If an inner surface was required to be coated for optimum use in air, the antireflective coating had to be added at a later time after the exposure, such as by adding an antireflective coated cover glass, which would add further weight, or by depositing a standard anti-reflective coating, which would frequently thermally destroy the hologram, or by depositing a cold anti-reflective coating, which would be less efficient and more fragile. Finally, this example of prior art required a piezoelectrically controlled exposure cover that had to be appropriately mounted and calibrated prior to exposure.

U.S. Pat. No. 4,478,490 discloses an alternative method of reducing coherent noise content through the modulation of the position of an apodizer in the optical path during an exposure. The motion of the apodizer creates a condition permitting the amplitude of the wavefront to be modified to alter a point source response, that is, to change the point spread function, whereby the fringe patterns created by the apodizer are unstable and hence reduce the noise content of the transmitted radiation.

Another prior art attempt to remove noise has been the use of a laser source without an etalon to reduce noise holograms from a surface further away than the coherence length of the laser (approximately 2 inches for a large argon laser). While this method can reduce noise, it is applicable only in cases in which the exposure apparatus surfaces are closely spaced, such as approximately one-quarter inch, such as in a HUD-type hologram with an aspheric mirror surface.

The prior art has frequently recognized the desirability of reproducing copies from a master hologram. A theory of such copying of holograms is set forth in Brumm, "Copying Holograms," Applied Optics, Volume 5, No. 12, page 1946, December 1966. Reference is also made to U.S. Pat. No. 3,758,186, U.S. Pat. No. 3,639,031, U.S. Pat. No. 3,647,289, U.S. Pat. No. 4,312,559, and U.S. Pat. No. 4,530,564 to disclose other methods of copying holograms.

In modern aircraft, there is frequently minimal space in the cockpit. This limitation requires that any optical system be folded and compressed for a head up display. As a result, complex aspheric reflecting mirrors are needed and holographic aspheric mirrors represent a lightweight and efficient solution to this requirement. As mentioned above, conventional glass or metal aspheric mirrors have been fabricated for use as a master reference in producing HUD holograms. This approach involves a lengthy and expensive procedure of grinding an aspheric mirror to the subjective requirements of a particular head up display. Furthermore, the nonspherical surface of such a master mirror limits how close the aspheric reference member can be placed relative to the recording material (unless it is also on an aspherical surface) for replicating the aspheric diffraction grating in the recording medium.

Another method to generate the master mirror that is known in the prior art is to provide computer generated holograms. In this matter, the design of the desired wavefront is mathematically described and a computer then forms a two-dimensional amplitude hologram representative of that wavefront. The computer can drive a printer to produce the desired diffraction grating on a substrate or alternatively create the grating by electronic or chemical procedures. A problem in using a computer generated hologram as an initial imaging source for the fabrication of a holographic HUD combiner is the noise in the computer generated master hologram. This noise is present in the form of a general nonuniformity of brightness and in multiple order scattering. The computer generated hologram has multiple order noise because the fringe pattern is generally formed as abrupt discrete units rather than sinusoidally varying as in an ideal holographic recording of a laser interference pattern.

It would be desirable to provide a method and apparatus for the reproduction of multiple hologram optical elements in an economical and efficient manner, to include scanning the exposure with a single mode polarization preserving fiber optic to provide the primary beam, with a lateral dithering motion of the fiber optic to reduce noise, with a relatively small distance between the photosensitive material forming the reflective holographic optical element and the reflective element which provides the second beam, and a relatively large translational motion which is gradual and generally follows the angular scanning motion.

SUMMARY OF THE INVENTION

A method and apparatus for exposing a recording medium with a moving fiber optic point source is provided. In one embodiment a scanning fiber optic coherent light point source provides one wavefront necessary to form a reflective hologram to be replicated in the production of complex optical elements, such as for use as a HUD combiner. A second wavefront, for example, reflected off of a reference mirror surface interacts within the recording medium to provide a desired hologram that can be used for multiple replications in producing aspheric reflecting surfaces for a HUD combiner. The fiber optic point source is moved in a predetermined manner during the exposure to reduce the multiple order scattering noise. By providing a slight dithering movement, the desired recording ray is only changed slightly. However, the noise scattering rays which are the result of individual scattering rays which are the result of individual scattering elements rather than the diffraction effect of the complete assemblage of the fringe pattern are displaced by a substantial distance. As a result of dithering the fiber optic point source during the recording, the scatter holograms are reduced by being smeared out with minimal effect on the main hologram.

The effect of the lateral dithering displacement of the fiber optic is to reduce noise in the holograms produced by reflections from glass or air interfaces in the system. The advantage of using a fiber optic and tilting the fiber optic to scan the entire format is that the beam need not be expanded to fill the entire format, so that the size of the hologram being produced can be large. The short distance between the photosensitive film and the mirror avoids reduction in efficiency of the primary hologram when the fiber optic is displaced laterally.

In those circumstances where the illumination point position change does not shift fringe spacing equally, it is also possible to vary the laser wavelength to be shifted continuously around the exposure area to effectively smear out spurious noise holograms.

A feature of the present invention is the utilization of a fiber optic point source during the exposure of the reflective hologram with a relative dithering movement between the fiber optic point source and the recording medium. The movement of the point source is such that any relative phase change in the desired primary recording rays is relatively small since the relative path changes are also small. However, any noise creating a spurious hologram will experience a path change over a much greater distance and therefore there will be relatively greater shifts in the fringes for a noise hologram. If these phase shifts reach half a wavelength, the noise hologram will be essentially wiped out. However, for typical exposure systems the amount of shift in the primary hologram will only be approximately one twentieth of the design wavelength, which will not measurably reduce the efficiency of the primary hologram.

Another feature of the invention is the utilization of the fiber optic point source during the exposure of the reflective hologram with a relatively large translation motion which is gradual and follows the angular scanning motion. The effect of this added motion is to permit mirror corrections in the aspheric source mirror; to permit variation of the wavelength in the final hologram recording medium, and to permit simulation of large distances for the point source in making large focal length holograms.

BRIEF DESCRIPTION OF THE DRAWINGS

The novel features that are considered characteristic of this invention are set forth with particularity in the appended claims. The invention itself, both as to its organization and method of operation as well as additional objects and advantages thereof, will best be understood from the following description when read in connection with the accompanying drawing in which:

DESCRIPTION OF THE PREFERRED EMBODIMENTS

Figure 1:
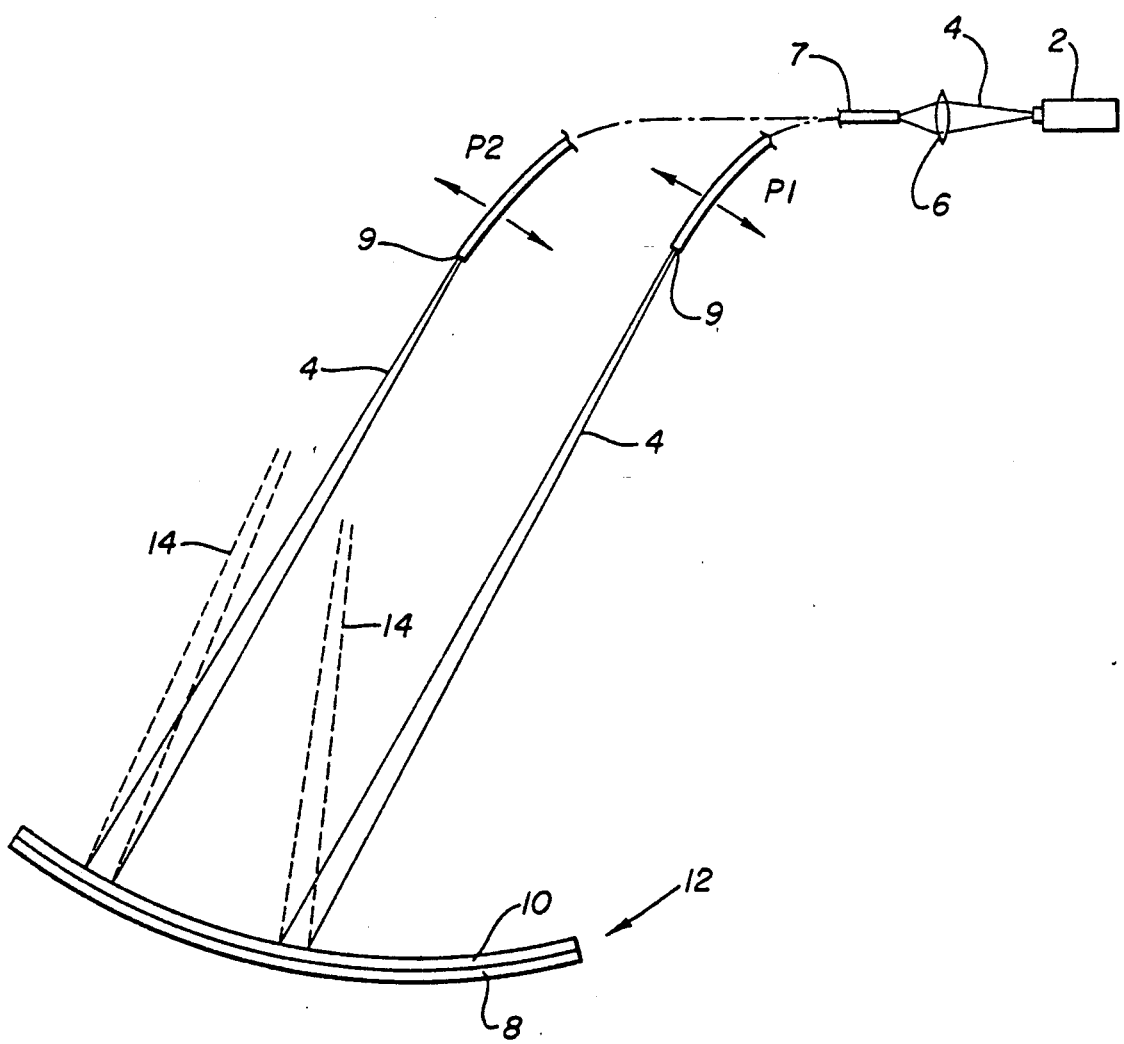
FIG. 1 is a schematic view of an exposure system for developing a HUD aspheric reflective hologram.

The following description is provided to enable any person skilled in the art to make and use the invention, and sets forth the best modes contemplated by the inventors for carrying out their invention. Various modifications, however, will remain readily apparent to those skilled in the above art, since the generic principles of the present invention have been defined herein specifically to provide a relatively economical method and apparatus for producing a reflective holographic optical element by moving a fiber optic point source.

The present invention recognizes the advantages of using a scanning fiber optic point source in the manufacturing of complex optical elements, such as aspheric reflectors used in head-up displays. Such a fiber optic point source can be moved for an angular scan, with both a small relative translational motion and a relatively large translational motion which is gradual and follows the angular scanning to provide a desired wavefront to provide the effect of an aspheric mirror configuration necessary to meet the constraints and optical performance required in the cockpit of an advanced aircraft. The present invention permits the manufacture of improved products for headup displays, laser eye or device protection elements visor displays, holograms for simulator domes, and large holographic optical elements such as are needed for making an entire windshield of a car or an airplane into a holographic element, or a optical element, and even thousands of square meters of hologram needed for the manufacture of solar concentrator devices. Single mode fiber optics which preserve polarization are commercially available for use in the manufacture of holograms. Such fiber optics can be moved and bent slightly without significantly changing the output of the fiber optic in either phase front or polarization, so that such fiber optics are advantageous in a scanning type system. The output beam of such fiber optics is coherent, with an angular beam spread of only a few degrees. A large format can be scanned by changing the direction in which the fiber optic is aimed, and the position of the fiber optic can be moved so as to prevent the noise hologram formed by reflection from distant objects or glass to air interfaces. For a typical head up display type of exposure system, the rate of scanning of the point source across the recording medium would be approximately 32 mm per second and the rate of lateral translational dithering motion relative to the recording medium would be approximately 1.2 mm per second.

The amplitude of the motion for both the dithering and the base position is related to: the distance of the photosensitive film to the mirror; the distance of the source from the mirror; the average angle of the exposure (angle the central ray hits the mirror); the curvature of the mirror; the wavelength of the exposure laser; the amount of efficiency loss acceptable in the final hologram; and the distance between the outer glass surface (the one whose reflections are to be negated) and the mirror. In most cases the dither rate will be higher than the change in the relative base position (it could not be lower).

In one illustrative example, a 1 watt laser may be scanned in an unexpanded 4 mm diameter beam. Assuming a 30° off axis beam, an apparent point source 20 inches from the mirror, a film-mirror distance of 0.010 to 0.20 inches, a substrate thickness of ½ inch, a point source translational motion during exposure of 2 mm will result in very little efficiency loss in the primary hologram, but about a 1000 to 1 loss in the noise hologram caused by the top of the substrate air reflection.

Assuming dichromated gelatin and an exposure level of about 200 mj/cm$^2$, any particular spot would be exposed for 0.025 seconds (assuming that there is no overlap and that all laser energy is used.) Thus the scan rate of the beam on the substrate would be 4 mm in 0.025 seconds or 160 mm/sec., or 80 mm/sec. dithering motion rate. In this case, absolute displacement can occur at the same rate (80 mm/sec).

In a more typical situation, the beam is expanded as it hits the mirror. For a 4 cm diameter spot (12.6 cm$^2$), the exposure time on spot would be 2.5 sec. Scan rate would be 1.6 cm/sec. (16 mm/sec). A dithering motion of 2 mm in the 2.5 sec or 0.8 mm/sec. can be tolerated.

A further complication occurs if the scans are overlapped (which would be the most general case). A 50% overlap would mean that each point would effectively be double exposed, with the time between exposures being the time of one scan line (in the case of a 30 cm HUD combiner—9.4 sec). The scan rate could be 32 mm/sec., and the rate of dithering 1.6 mm/sec., but the absolute displacement for the point source should be no more than the 2 mm in the total time of exposure for a single point (9.4 space +2.5 sec. exposure 12 sec.) for 0.16 mm/sec.

A master mirror is typically used in the exposure of a head-up display reflective hologram in a so-called single beam system, with the shape of the mirror being similar in shape to that of the final hologram. Where the mirror is in close proximity to the recording medium, generally on the order of 0.010 inches away, translational motion of the point source from point P1 to point P2 on the order of 1 to 2 mm for a point source which is approximately 20 inches away from the recording medium will not degrade the efficiency primary hologram to any significant extent. However, the motion can be sufficient to reduce noise holograms caused by reflections from outer glass surfaces by a factor of about 1,000.

The angular scanning of the output tip of a fiber optic used as a point source may be combined with a relatively small translational dithering motion about a point of origination of the angular scan to provide a relatively noise-free hologram. The third motion, that of providing a different lateral position of the point of origination of the angular scan of the point source permits the effect of tailoring the point source to any desired shape, so as to permit one to make the hologram as a more complex asphere than the master mirror, to make the final hologram vary in wavelength across the recording medium, since the angle at which the hologram is exposed can be controlled independently for each point exposed in the recording medium, and to make the apparent point source at a different distance than the actual distance, so that a distance of many feet can be simulated on a standard sized optical table. Translational dithering motion and angular scanning may be combined without unduly lengthening the exposure time.

FIG. 1 is a schematic illustration of an exposure system for producing a hologram from which production holograms for HUD combiners can be manufactured on the actual combiner. A laser 2 generates a primary, or reference beam 4 which can be directed through conventional optics 6 and through a primary single mode polarization preserving optical fiber 7 to form the reference wavefront for impacting upon a photosensitive film plane 10 in a recording module 12 containing, for example, a dichromated gelatin as a recording material.

The reference beam from the laser 2 is reflected from a reflecting mirror 8 to form the object beam 14 which is shaped by the mirror to form the object wavefront which, together with the reference wavefront, will form the master hologram in the recording medium 10 that can be replicated in the production of actual HUD combiners.

As can be appreciated, FIG. 1 is not drawn to scale, and the movement of the point source from the point P1 to the point P2 shown in FIG. 1 represents a feature of the present invention to reduce the noise hologram originating in the glass-air interface reflection. Thus, the fiber optic source of the primary beam 4 and the object beam 14 can be moved from the position P1 to position P2 during the exposure of the recording medium.

The actual lateral translational dithering movement relative to the recording medium will depend on the particular hologram being formed but should be at a rate of about 0.16 mm/sec and within a magnitude of 2 mm or less for a point source at a distance of approximately 20 inches away from the recording medium. The net result of this small translational dithering movement of the fiber optic point source during the exposure of the recording module is a cleaner, higher contrast image in the master hologram. The gradual, larger translational motion which follows the angular scanning of the hologram being formed effectively allows each point in the exposure to be made from a different location, since for each point in the exposure the point source can be effectively translated 2 mm relative to the recording medium without disturbing the primary hologram.

Thus, for example, while angular raster scanning is taking place by rotation of the output tip 9 of the optical fiber as the pivot point about an axis, a relatively small lateral translational dithering motion of the fiber may be provided along the axis, while a relatively larger translational motion may be provided transverse to the translational dithering motion, or more generally in the plane of the axis of angular scanning. While the translational dithering motion is generally much faster than the angular scanning rate to reduce noise in the exposure, the larger translational motion is gradual and is synchronized with the angular scanning motion.

When it is desired to vary the laser wavelength, it is possible to use an interferometer to measure a predetermined portion of the pattern and to accordingly adjust the wavelength to maintain that position in the pattern stable to thereby balance the variation of the wavelength with the fringe spacing and accordingly use the wavelength to compensate for the movement of the point source. Since the desired effect is a relative dithering movement between the point source and the recording medium, it can be seen that the recording medium can also be displaced laterally to achieve the same effect. Additionally, other optical elements can be utilized to produce the desired, controlled, predetermined movement of the point source to achieve the purpose of the present invention.

As can be appreciated by a person of ordinary skill in the holographic field, various objective parameters are involved in recording a hologram. For example, the recording material, such as dichromatic gelatin, is derived from a natural source and can provide different exposure characteristics and developing time periods. Additionally, the particular design wavelength and the availability of a constant light intensity for such a design wavelength for a particularly hologram will have to be computed and will affect the specific parameters of any exposure system. For example, a hologram used as an aspheric reflector in a HUD combiner preferably will have a design wavelength to maximize the reflection of light from a cathode ray tube. This wavelength is not readily available in a laser source and computations are made in the development of the exposed hologram to allow for this variance.

It will be appreciated that other methods and apparatus can be used for scanning the primary beam, and for providing a reflective element. The reflective element serving to mirror the primary beam back through the photosensitive material, for example, may be a diffraction optical element itself, with a physical shape matching that of the film substrate, and the original source of the diffraction optical element may be a computer generated hologram, a double beam exposure system, or an aspheric mirror.

In essence, there are numerous variables that are subjectively determined when producing holograms and people of ordinary skill in this field are aware that such variables exist and, when determined as to a particular value, can readily provide a prediction of the results of the process of producing a hologram. Accordingly, when evaluating the features of the present invention and ... mining its scope, the invention sole should be measured from the following claims.

What is claimed is:

1. A method for exposing a reflective holographic optical element, comprising the steps of: 'a) illuminating a recording medium from a movable point source of illumination to provide exposure of a plurality of points on said recording medium wherein the wavelength of the illumination is varied as a function of the location of the point on the recording medium being exposed; and b) providing angular scanning of said recording medium by rotating said point source about an axis of scanning, and simultaneously providing translational motion of said point source relative to said recording medium to vary the location of the point source during said exposure of said plurality of points on said recording medium.

2. The method of claim 1, wherein said point source comprises a single mode polarization preserving optical fiber.

3. The method of claim 1, wherein the location of said point source is varied as a function of the location of the point on the recording medium being exposed.

4. The method of claim 1, wherein said point source is a predetermined distance from said recording medium, and said step of scanning comprises synchronously varying said translational motion and said angular scanning to simulate an apparent point source at a distance from the recording medium different from the point source distance from the recording medium.

5. The method of claim 1, further including the step of providing a translational dithering motion of said point source to reduce noise in said holographic optical element.

6. A system for exposing a reflective holographic optical element, comprising:

a) means for illuminating a recording medium from a movable point source of illumination to provide exposure of a plurality of points on said recording medium;

b) means for scanning said recording medium by rotating said point source about an axis of scanning, and by simultaneously providing translational motion of said point source relative to said recording medium to vary the location of the point source during said exposure of said plurality of points on said recording medium; and c) means for varying the wavelength of illumination as a function of the location of the point on the recording medium being exposed.

7. The system of claim 6, wherein said point source comprises a single mode polarization preserving optical fiber.

8. The system of claim 6, further including means for varying the location of said point source as a function of the location of the point on the recording medium being exposed.

9. The system of claim 6, wherein said point source is a predetermined distance from said recording medium, and further comprising means for synchronously varying said translational motion and said angular scanning to simulate an apparent point source at a distance from said recording medium different from the point source distance from the recording medium.

10. The system of claim 6, further including means for providing a translational dithering motion of said point source to reduce noise in said holographic optic element.

* * * * *